United States Patent
Jarvis

(10) Patent No.: US 9,574,348 B2
(45) Date of Patent: Feb. 21, 2017

(54) TUBULAR COMPOSITE BEAMS

(71) Applicant: Charles Dwight Jarvis, Jonesboro, GA (US)

(72) Inventor: Charles Dwight Jarvis, Jonesboro, GA (US)

(*) Notice: Subject to any disclaimer, the term of this patent is extended or adjusted under 35 U.S.C. 154(b) by 0 days.

(21) Appl. No.: 14/804,272

(22) Filed: Jul. 20, 2015

(65) Prior Publication Data

US 2015/0323106 A1 Nov. 12, 2015

Related U.S. Application Data

(63) Continuation-in-part of application No. 14/269,091, filed on May 3, 2014.

(51) Int. Cl.
| | |
|---|---|
| *F16L 9/18* | (2006.01) |
| *E04C 3/29* | (2006.01) |
| *F16L 9/19* | (2006.01) |

(52) U.S. Cl.
CPC ... *E04C 3/29* (2013.01); *F16L 9/19* (2013.01)

(58) Field of Classification Search
USPC .............. 138/114, 116, DIG. 11, 30, 38, 39, 108, 138/112, 171
See application file for complete search history.

(56) References Cited

U.S. PATENT DOCUMENTS

| | | | | |
|---|---|---|---|---|
| 414,970 | A * | 11/1889 | Camp | F16L 9/18 138/114 |
| 520,222 | A * | 5/1894 | Rodin | F15D 1/02 138/111 |
| 2,756,032 | A * | 7/1956 | Dowell | F28D 21/0008 138/114 |
| 2,929,408 | A | 3/1960 | Weatherwax | |
| 3,585,910 | A * | 6/1971 | Brown | E01C 11/106 138/115 |
| 4,312,162 | A | 1/1982 | Medney | |
| 4,397,304 | A * | 8/1983 | Villain | F24J 2/265 126/593 |
| 5,238,716 | A | 8/1993 | Adachi | |
| 5,471,809 | A * | 12/1995 | Frankel | E04C 3/29 138/114 |
| 6,283,159 | B1 | 9/2001 | Tada | |
| 7,198,438 | B2 | 4/2007 | Kosmowski | |
| 7,624,788 | B2 * | 12/2009 | Brown | F28F 21/063 138/112 |
| 2005/0241717 | A1* | 11/2005 | Hallot | F16L 1/16 138/149 |
| 2006/0096314 | A1 | 5/2006 | Nakamura | |

* cited by examiner

*Primary Examiner* — James Hook
(74) *Attorney, Agent, or Firm* — Crose Law LLC; Bradley D. Crose

(57) ABSTRACT

Various implementations of tubular composite beams (TCB's) are disclosed. The TCB's of the present disclosure may have improved formability, increased strength, reduced weight, better producibility or a combination of the foregoing. Furthermore, the composites tubular structures of the present disclosure may have greater strength to weight ratios than prior art composites.

6 Claims, 12 Drawing Sheets

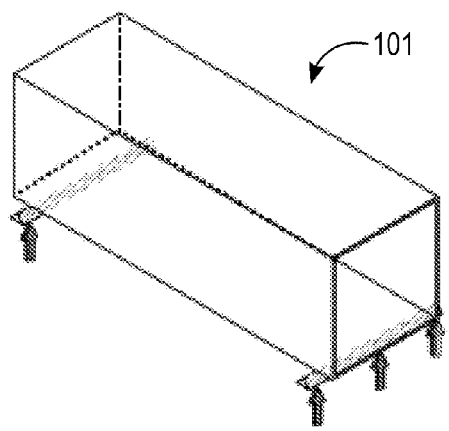
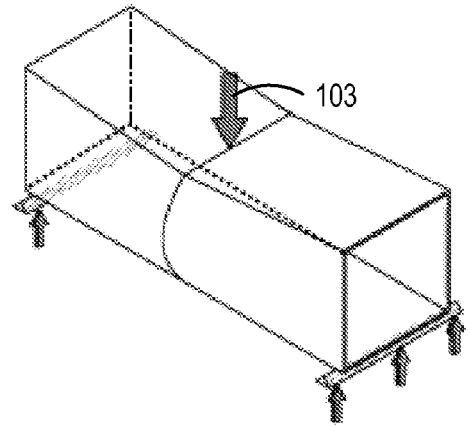
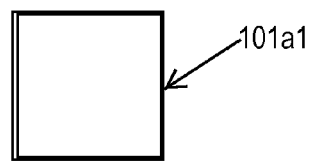
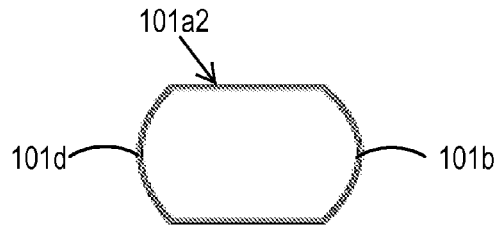
FIG. 1A1            FIG. 1A2
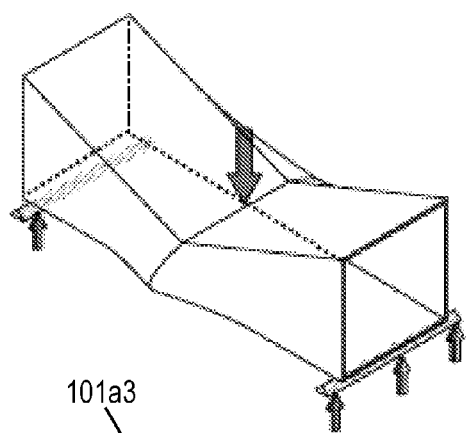
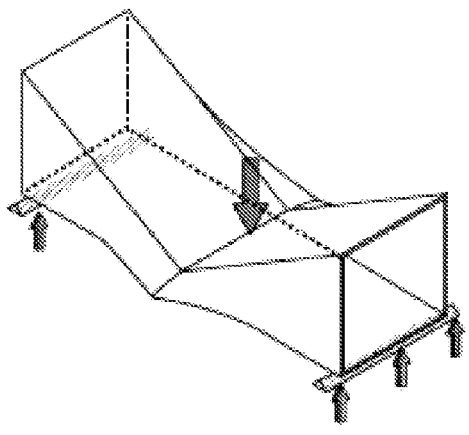
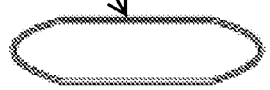
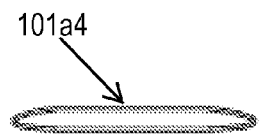
FIG. 1A3            FIG. 1A4

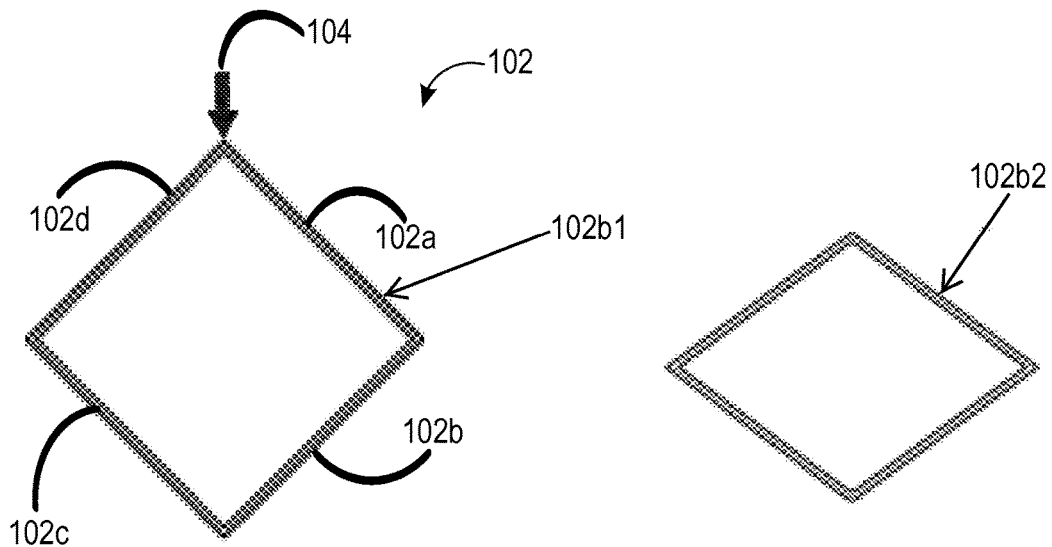
FIG. 1B1
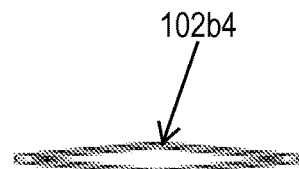
FIG. 1B2
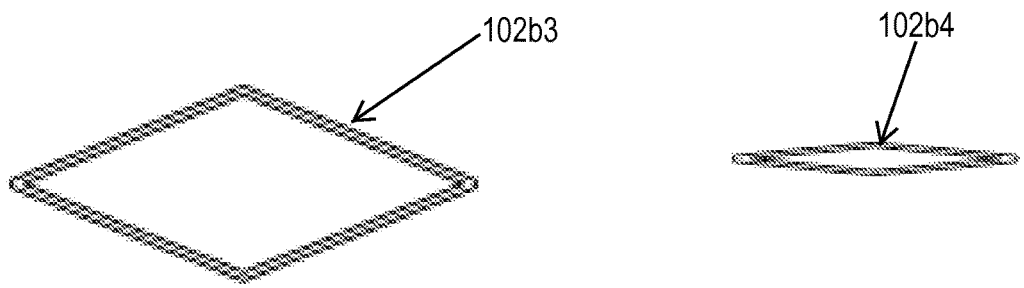
FIG. 1B3
FIG. 1B4

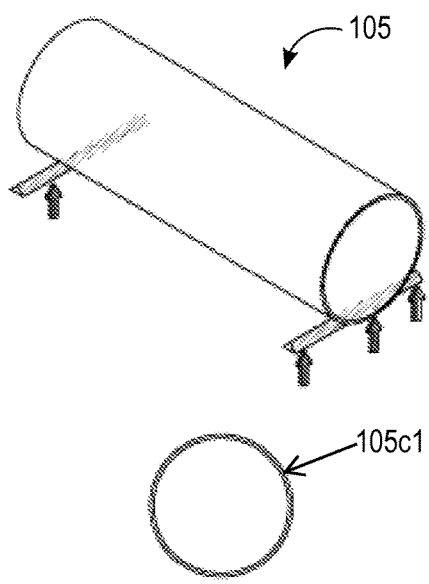
FIG. 1C1
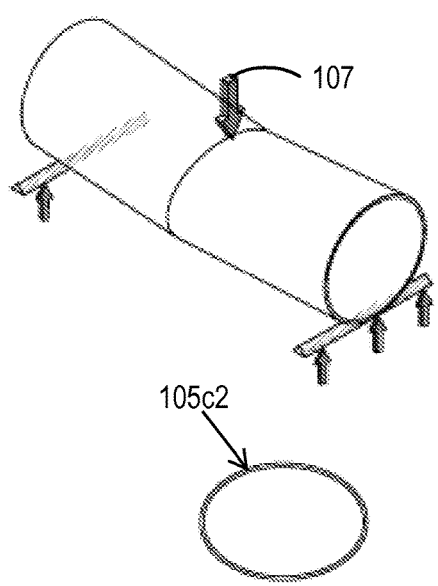
FIG. 1C2
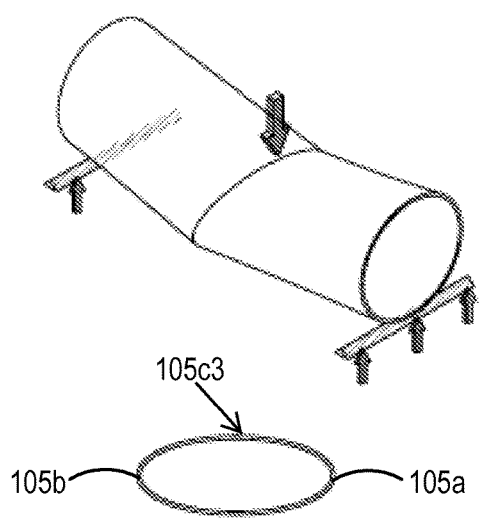
FIG. 1C3
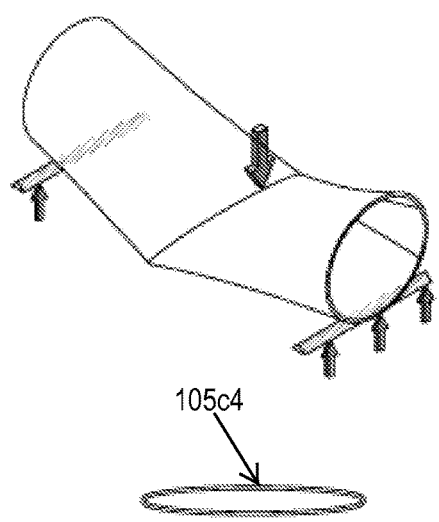
FIG. 1C4

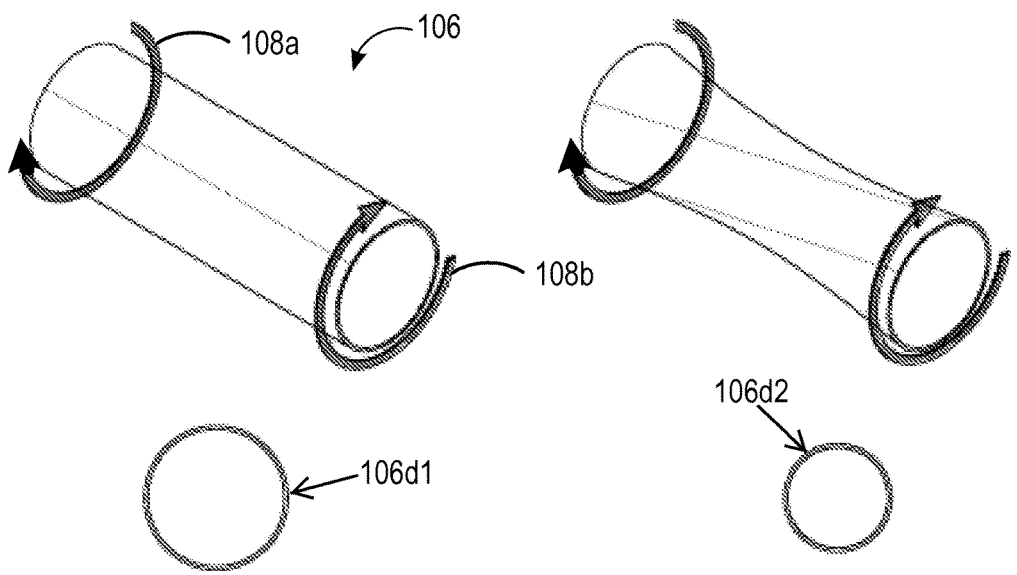
FIG. 1D1   FIG. 1D2
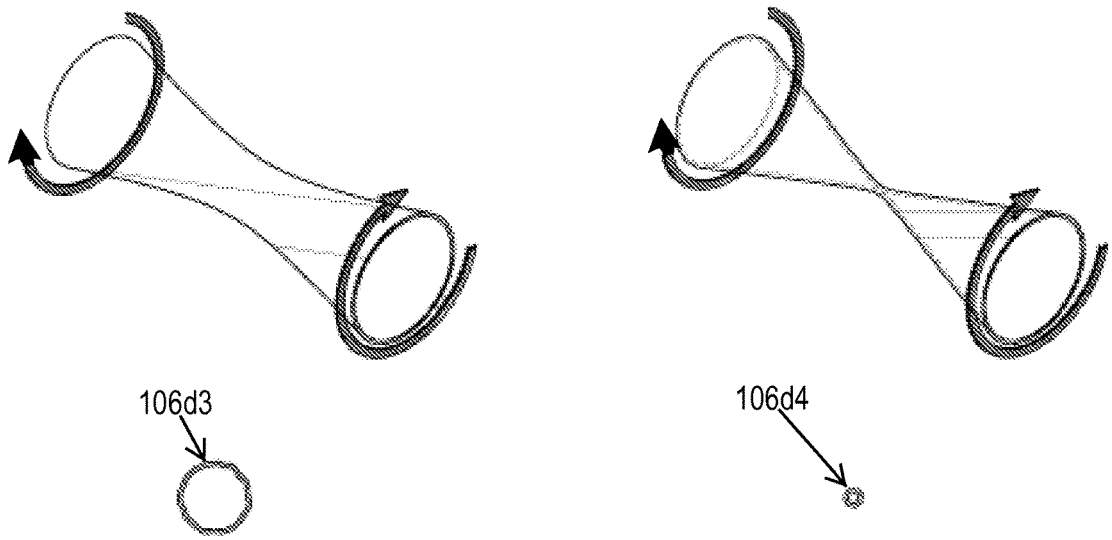
FIG. 1D3   FIG. 1D4

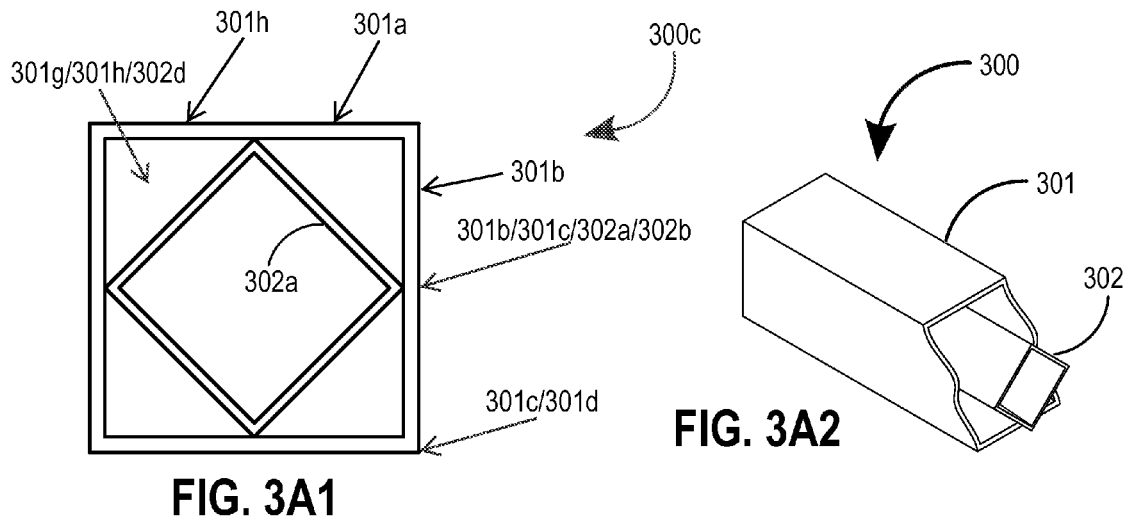
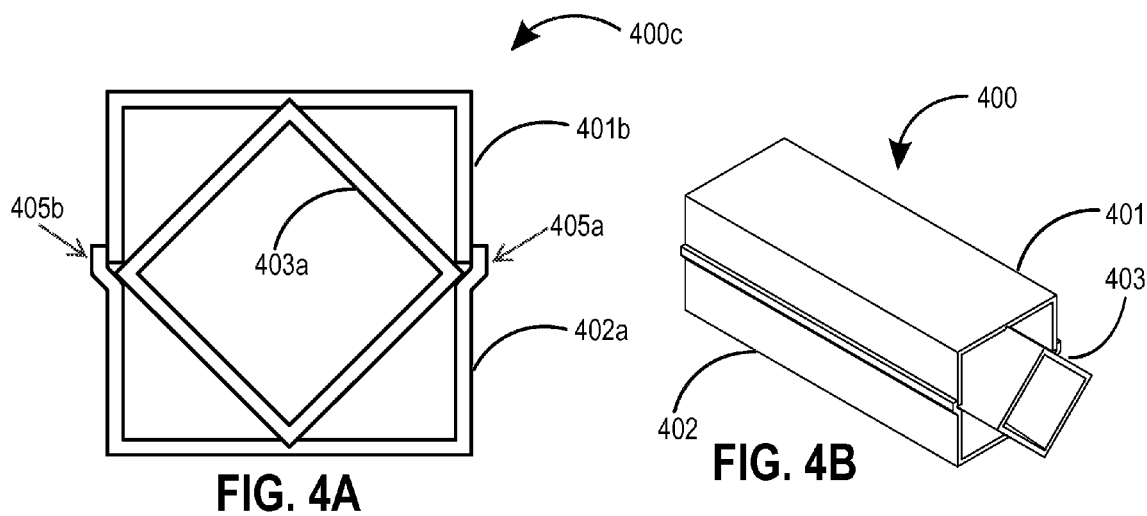
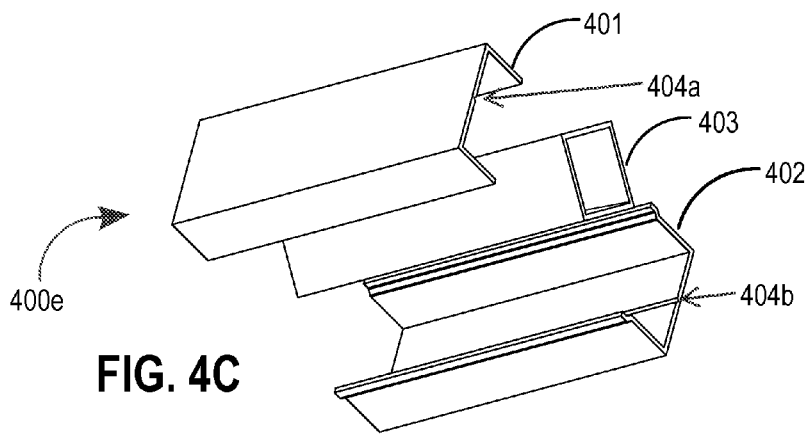

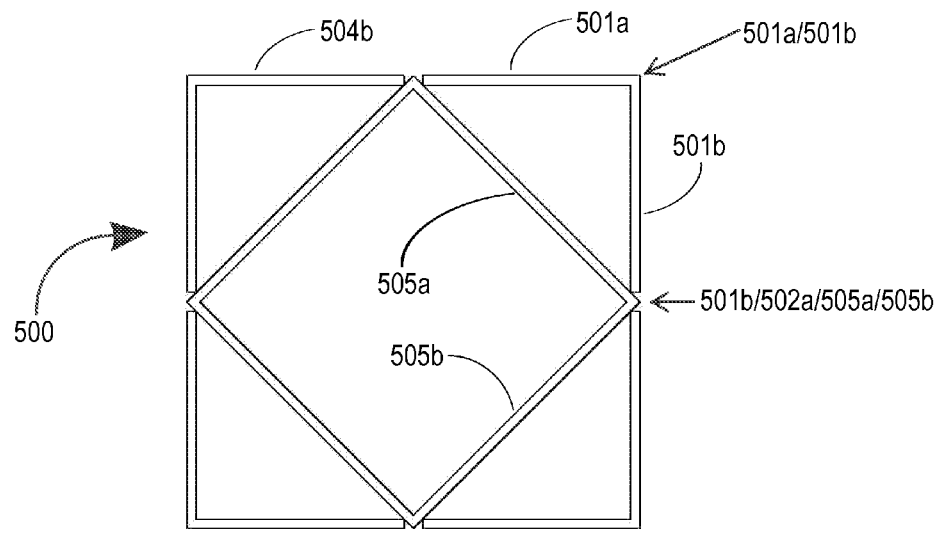
FIG. 5A
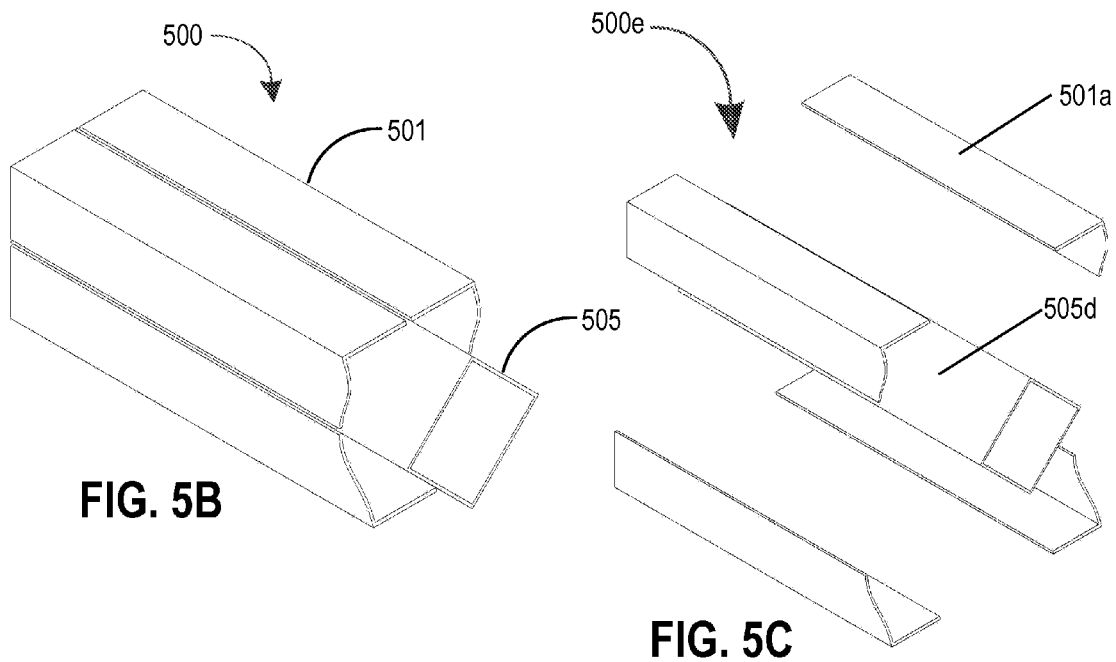
FIG. 5B
FIG. 5C

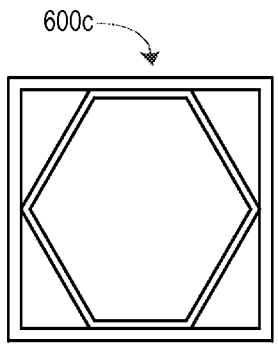
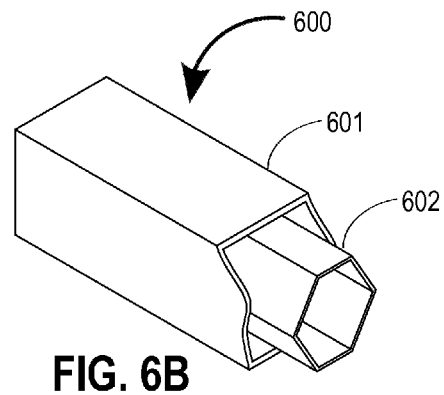
FIG. 6A  FIG. 6B
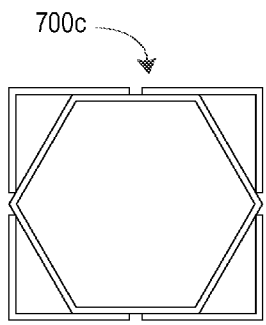
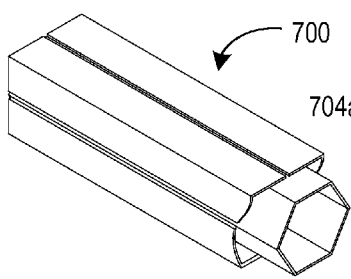
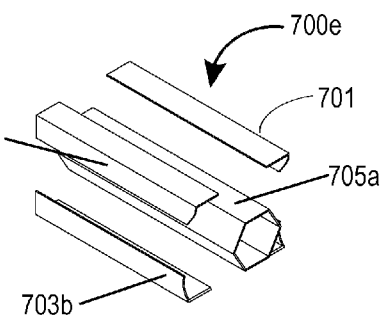
FIG. 7A  FIG. 7B  FIG. 7C
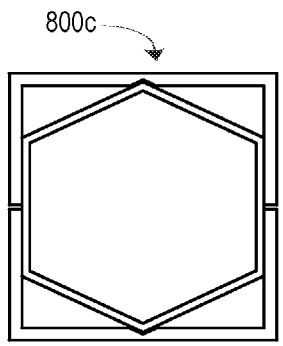
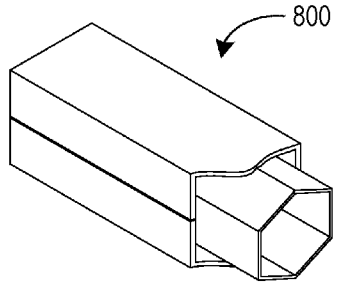
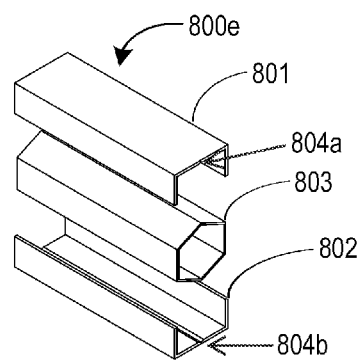
FIG. 8A  FIG. 8B  FIG. 8C

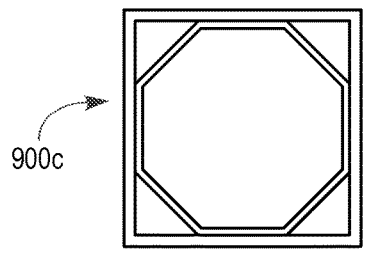
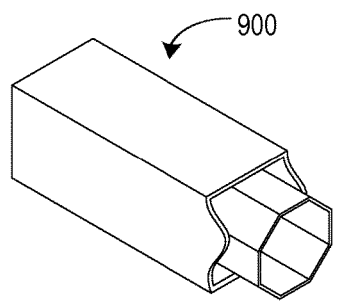
FIG. 9A  FIG. 9B
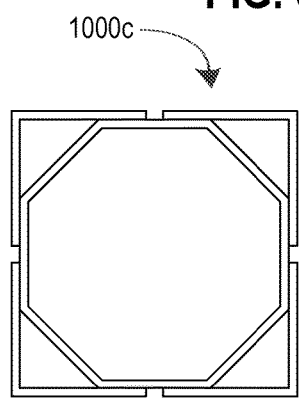
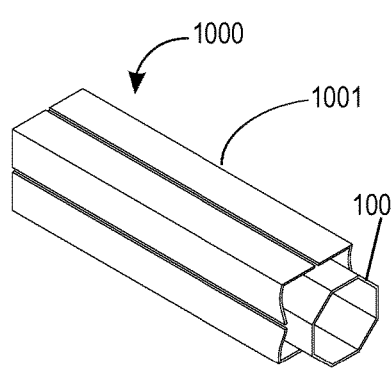
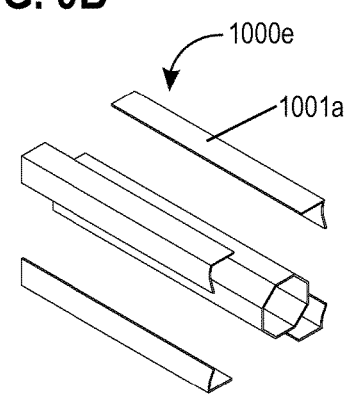
FIG. 10A  FIG. 10B  FIG. 10C
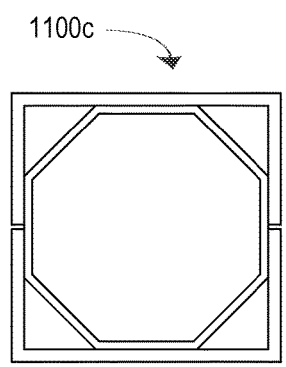
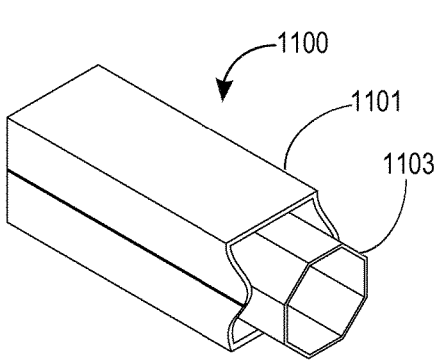
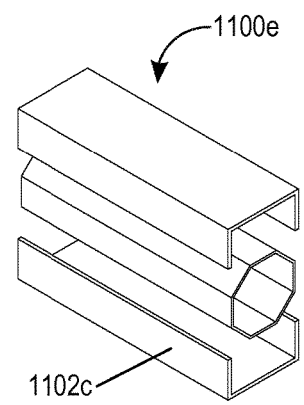
FIG. 11A  FIG. 11B  FIG. 11C

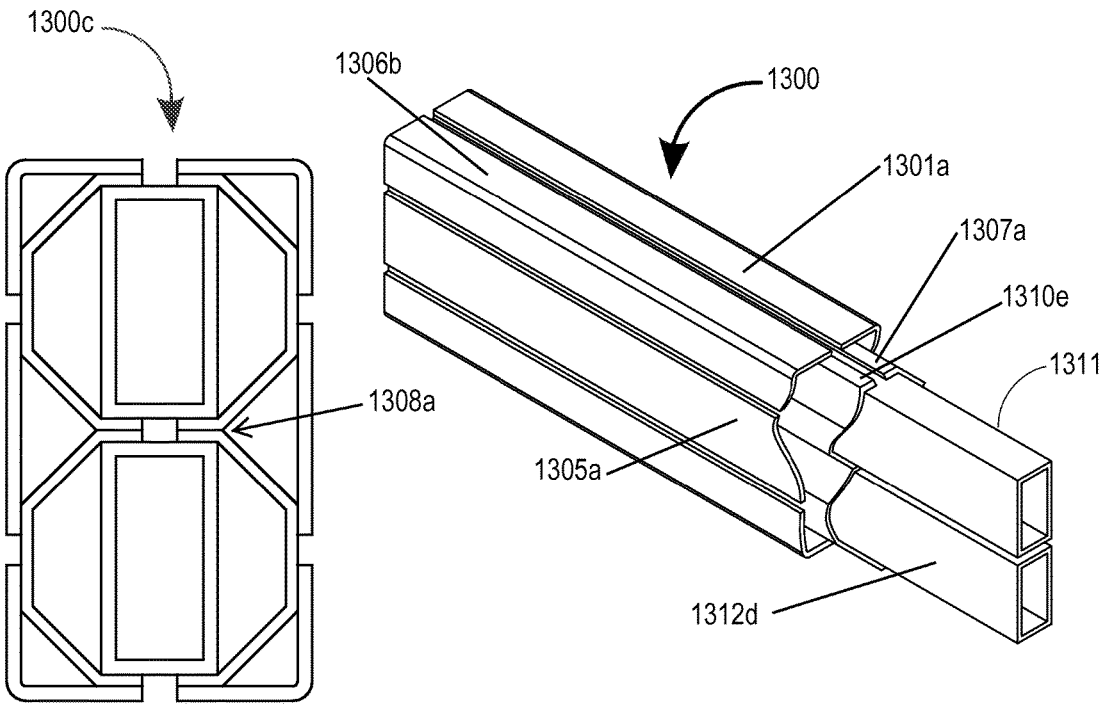
FIG. 13A
FIG. 13B
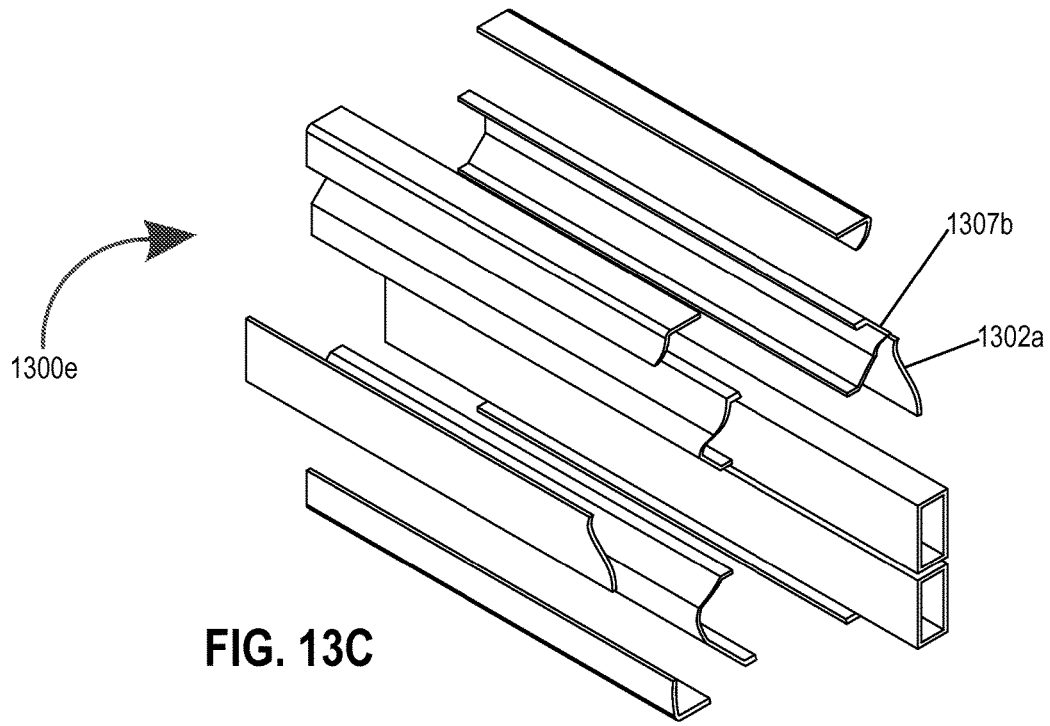
FIG. 13C

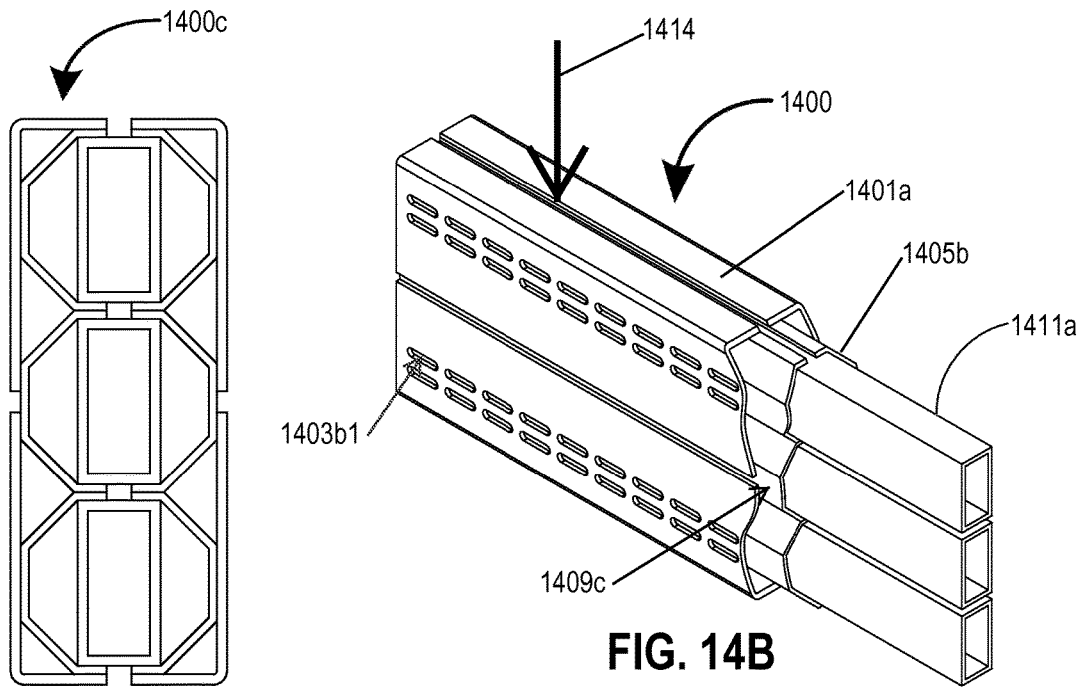
FIG. 14A
FIG. 14B
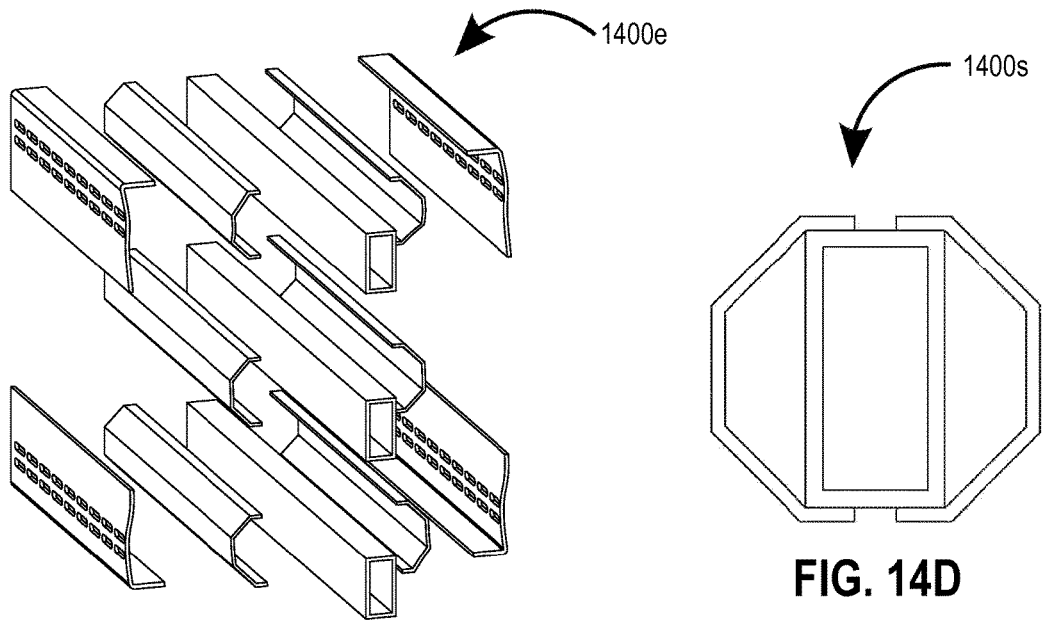
FIG. 14C
FIG. 14D

TUBULAR COMPOSITE BEAMS

CROSS REFERENCE TO RELATED APPLICATION

This is a continuation-in-part patent application claiming the benefit of U.S. patent application Ser. No. 14/269,091, filed on May 3, 2014 and entitled COMPOSITE TUBULAR STRUCTURES, and is incorporated herein by reference in its entirety.

TECHNICAL FIELD

This disclosure relates to tubular composite beams (TCB's).

BACKGROUND

The geometrical construction of a structure may be an important factor in its performance. For example, it has been long known that triangles and trapezoids are very useful in producing stronger structures.

BRIEF DESCRIPTION OF DRAWINGS

FIGS. 1A1-1D4 illustrate the impact of the cross-sectional geometry of a tubular structure on the axial and torsional strength of a tubular structural beam.

FIGS. 3A-5C illustrate design rational, construction and manufacturing techniques for producing rectangle-in-a-rectangle tubular composite beams (TCB's) that incorporate triangles in the cross-sectional view.

FIGS. 6A-8C illustrate the same for hexagon-in-a-rectangle TCB's.

FIGS. 9A-12C illustrate the same for octagon-in-a-rectangle TCB's.

FIGS. 13A-14D illustrate the use of internal octagon arrays that employ triangles and trapezoids to increase the resistance of rectangular TCB's to torsional and axial failures.

DETAILED DESCRIPTION

Figure 2A:
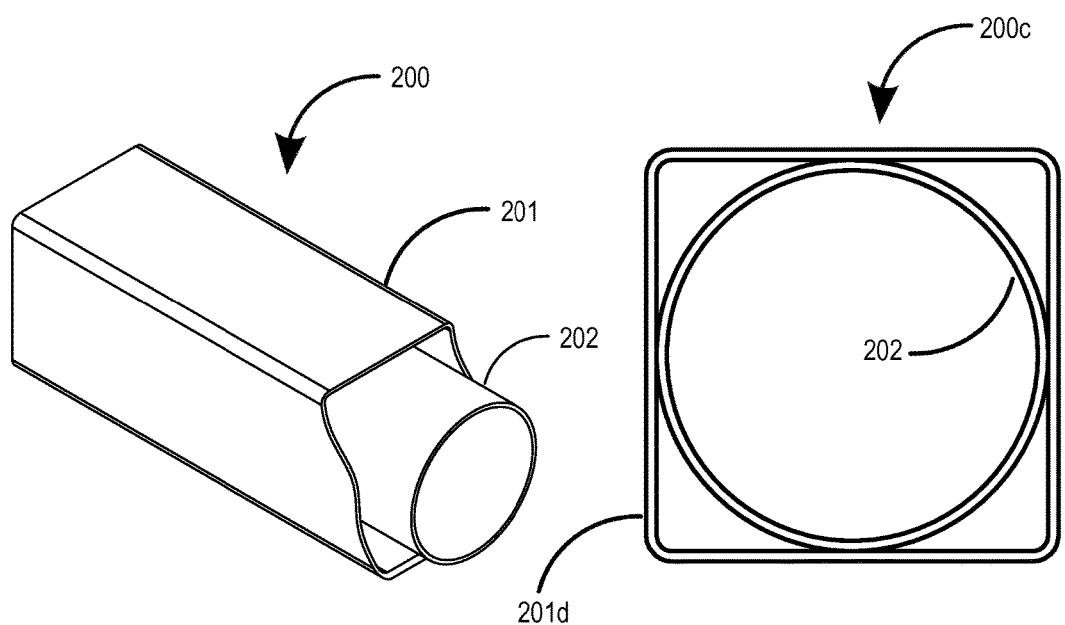
FIGS. 2A and 2B illustrate a prior-art crossbeams constructed from either a round, steel tube inserted into square, steel tube or a square, steel tube inserted into a round, steel tube, both of which is then is glued and spot-welded together.

Various implementations of tubular composite beams (TCB's) that facilitate manufacturing processes and the incorporation of triangular and/or trapezoidal figures in the cross-sectional views are disclosed. The tubular composite beams of the present disclosure may have improved formability, increased strength, reduced weight, be more cost effective or a combination of the foregoing. Furthermore, the TCB's of the present disclosure may have greater strength to weight ratios, producibility and reliability than prior art, tubular composites.

In some implementations of this disclosure, the physical dimensions of various components (multi-sided polygon tubes, multi-sided channels, u-tube channels, angles, I-beams, or flat plates), the material or alloy from which the components are made, the components' geometries and the manufacturing techniques may be varied to meet specified strength to weight ratio requirements, specific formability requirements, specific cost requirements or some "trade-off" combination of all three.

In some implementations of this disclosure, various components or sub-assemblies of components may be positioned relative to one another (a lay-up) and bonded linearly by welding, brazing or curing deposited adhesive to produce TCB's that may be rectangular in shape and that may contain multiple triangles and or trapezoids.

In some implementations of this disclosure, various internal geometries of triangles and or trapezoids may be formed and positioned to counter-act normal or angular axial forces equally and thus improve the resistance to torsional forces as well.

Before analyzing the details of the figures in this disclosure, the convention for assigning designation numbers for components, line segments, angles, etc. needs to be explained. This convention allows all the line segments in figures such as FIG. 14A-D to have a designated number without having so many numbers on the figure that it makes it difficult to view and comprehend it. For this reason, only a few of the designation-numbers are shown and all others may be derived by mentally applying the convention.

By convention, components are given numerical numbers with the first designation being the exterior component in the top-middle or first right, as applicable. The exterior components are then assigned a number consisting of the figure number and 01 for the first component, 02 for the second component and so on. Once all exterior components are designated, the procedure is repeated for the first group or layer of interior components by giving the top-middle or first right the next available number. This procedure is continued until all components are designated.

The line segments of a component's cross section are designated by the number denoting the component followed by an alpha character. Again, the first, top line segment is assigned the number of that component followed by a. Going in a clock-wise direction, the next line segment is assigned the component number followed by b. This procedure is repeated until all the line segments of that component have been designated. This is illustrated in FIG. 3A1 where 301$a$, 301$b$, 301$c$, 301$d$, 301$e$, 301$f$, 301$g$ and 301$h$ designates the line segments going in a clockwise direction of the cross section 300$c$ for the component 301. The designation number for a line segment in a cross-sectional view is also used for the surface in a three dimensional drawing to designate the surface associated with that line segment.

Figures, such as triangles are denoted by the applicable line segments as is illustrated by triangle 301$g$/301$h$/302$d$ in FIG. 3A1. Points are designated by the intersecting line segments at that point, as is also illustrated in FIG. 3A1. Angles such as angle 301$c$/301$d$ in the bottom, right corner of FIG. 3A1 are denoted by the line segments that form the angle.

A specific section of a component is denoted by the section's first line number, followed by the next, higher number for the next line segment number and so on until that segment is defined. Consistency in assigning designation numbers may make the figures easier to comprehend. Also, the use of a convention may allow the figures to be visualized mentally without actually looking at the figures.

FIGS. 1A1-1D4 illustrate the relationships of the geometry of a tubular structure and the direction of the applied force on the axial and torsional strength of that tubular structure.

FIGS. 1A1-1D4 are duplicated from the referenced patent application Ser. No. 14/269,091 and are included here to clearly disclose the transversion from the analyses of the failure modes illustrated in FIGS. 1A1-1D4 to the disclosed concept that the opposing forces of triangle or trapezoid geometries impede these failure modes. The analyses of these figures' and associated discussion also form the basic principle that more complex TCB's may transverse from the simple square-in-a-square TCB of FIG. 3A1 to TCB's with multiple arrays for which the cross-sectional views may include either or both multiple triangles and trapezoids and for which the strength to weight ratios vary and may improve with the number of triangles and/or trapezoids. Analyses of the cross-sectional views of complex TCB's transverse to the production method of positioning (sandwiching or laying-up) an internal tube between sections of the outer tube and then linearly bonding the components together either sequential or simultaneously and with multiple or single bonding methodologies such as with adhesives, with brazing or with welding. The positioning techniques for producing TCB's may be easier to perform than prior art insertion techniques and may permit much longer TCB's to be produced as compare to insertion. Furthermore, knowing the relative effect of the cross-sectional geometries on the force required to bend a TCB transverses to designs of TCB's that may be more easily bent horizontal, vertical or at an angle in between.

More specifically, FIGS. 1A1-1A4 illustrate the failure sequence of a rectangular tube when a normal force 103 is applied to tube 101, and FIGS. 1B1-1B4 illustrate cross-sectional views 102b1-10124 of the failure sequence of rectangular tube 102 when a force 104 is applied diagonally.

Tube 102 of FIG. 1B1 is equivalent (material alloy, wall thickness, width and height) to tube 101 of FIG. 1A1 but rotated 45 degrees. That is, the force 104 is applied diagonally at a point on the edge of tube 102. The failure sequence illustrated in FIGS. 1B1 to 1B4 may be a rough approximation of what initially happens when torsional (twisting) forces are applied to a rectangular tube. As shown by the cross-sectional views 102b1-102b4 of the rectangular tube 102 in FIGS. 1B1-1B4, the angles 102d/102a and 102c/102b at the vertical corners may increase while the angles 102a/102b and 102d/102c at the horizontal corners may decrease as force 104 is applied to tube 102. It is noted that only a relatively small force 104 may be required to bend tube 102 diagonally because relatively little material is being deformed at all four corners.

As shown by the cross-sectional views of the rectangular tube 101 in FIGS. 1A1-1A4, more material may be deformed when sides 101b and 101d are bowed during bending of tube 101 than the material deformed at all four corners when tube 102 is bent. Thus, a greater amount of force may be required to bend tube 101 in FIGS. 1A1-1A4 than to bend tube 102 in FIGS. 1B1-1B4. The impact of a force on a rectangular tube is highly dependent upon the direction from which it is applied.

FIGS. 1C1-1C4 illustrate the failure sequence of a round tube 105 when an axial force 107 is applied to tube 105. As shown by the cross-sectional views 105c1-105c4 of the round tube 105 in FIGS. 1C1-1C4, the relative amount of material being deformed indicates that a force greater than the amount of force require to bend tube 102 but less than the amount of force required to bend tube 101 may be required to bend tube 105.

FIGS. 1D1-1D4 illustrate the failure sequence of a round tube 106 when torsional forces 108a, b are applied to tube 106. As shown by the cross-sectional views 106d1-106d4 of the round tube 106 in FIGS. 1D1-1D4, more material may be deformed when tube 106 is twisted than the material deformed when either tubes 101, 105 and 102 are bent. Thus, a greater amount of force may be required to twist tube 106 than to bend tubes 101, 105 and 102.

As demonstrated by FIGS. 1A1-1D4, the geometry of a tubular structure may affect the axial and torsional strength of the structure. For example, a rectangular tube may have greater resistance to bending and a round tube may have greater resistance to twisting.

Figure 2B:
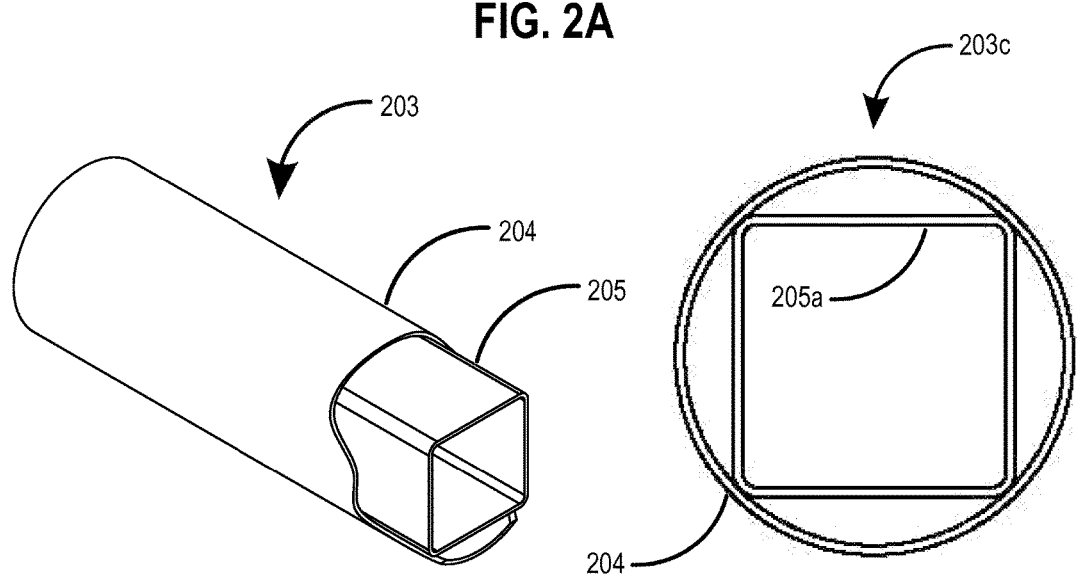

Prior art for TCB's is best illustrated by cross-section 200c in FIG. 2A of this disclosure which depicts the cross-section of a crossbeam constructed from round steel tubing inserted into square steel tubing that is glued and spot-welded together as disclosed in U.S. Pat. No. 7,198,438 by Wojciech B. Kosmowski. The '438 patent discloses that the round tubing has a cross-sectional configuration which has high strength against torsional forces and the square tubing has a configuration which has high strength against bending forces. According to the 438 patent, the combination of the two lightweight structural elements (i.e., the round steel tubing 200b inserted into square steel tubing 200a in FIG. 2A of this disclosure) has very high strength against torsional forces and bending forces, providing a high strength, very stiff structural assembly. It is stressed that the principles being employed in 438 patent is that round tubes provide resistance to torsional forces and that rectangular tubes provide resistance to normal, axial forces (but not to diagonally applied forces). In addition, the structure disclosed in the '438 patent is limited to square tubes of which the side length is close to the diameter of the round tube. Furthermore, the improvement in strength of the structure disclosed in the '438 patent is limited as no triangles are formed and only two tubes are used. Kosmowski also disclosed a second composite structure of a square tube in a round tube, as illustrated in FIG. 2B, which is suggested by the first composite structure shown in FIG. 2A.

Kosmowski's disclosure related only to a round tube in a square tube or a square tube in a round tube. There is nothing about Kosmowski's disclosure that suggests that a square-tube-in-a-square-tube may be a superior or even a viable option. It is only by detailed analyses of FIGS. 1A1-1D4, presented in this disclosure, and by asking how can these forces be impeded, that a square-in-a-square is suggested. Kosmowski combined the properties of a square and a tube to design his crossbeam. Contrary to his approach, this disclosure combines the axial bending resistance properties of rectangles to normal forces by placing a square-in-a-square so that a diagonal force on one square is a normal force on the second square and vice versa.

FIGS. 3A1 and 3A2 are also reproduced from patent application Ser. No. 14/269,091 and illustrates an implementation of a TCB 300 of the present disclosure having a square tube 302 inserted diagonally into another square tube 301. In some implementations, the square tube 302 is dimensioned such that all four corners of the square tube 302 may be joined (e.g., by curing previously deposited adhesive or brazing or welding) to the interior surfaces of the square tube 301.

Referring back to FIG. 1A2, structures that impede the bowing of sides 107a, b (i.e. impedes the failure mechanism) will increase the axial strength of tube 101. The triangles 301a/301b/302a, 301c/301d/302b, 301e/301f/302c and 301g/301h/302d, as shown in cross-section 300c, may increase the strength of the composite structure. If a normal, axial force is applied at the top side (point 301a/301h/302a/302d) of tube 301 in order to bend TCB 300, then angles 301a/301b, 301c/301d, 301e/301f, 301g/301h, 302a/302a and 302b/302c must be forced open, while angles 302a/302b and 302c/302d must be compressed. In addition, all line segments must be either stretched, bowed or both. Also the bonds at points 301a/302a/302d/301h, 301b/301c/302b/

302*a*, 301*d*/301*e*/302*c*/302*b* and 301*f*/301*g*/302*d*/302*c* must be placed under stress. The axial force required to deform each line segment and bond of TCB 300*c* in order to bend it is much, much greater than the axial force required to bend the equivalent (by weight) beam 101 in FIG. 1A1.

An equivalent argument could be made for a diagonal force such as the diagonal force 104 in FIG. 1B1 The normal and diagonal forces required to deform TCB 300 may be approximately equal. It may take a significant force to twist TCB 300 as compared to twisting rectangular tube 102.

For a tube longer than about 3 feet, TCB 300 may be extremely difficult to produce by insertion. During forced insertion or forming (bending), the thin walled, inner tube 302 may follow the path of least resistance and rotate, thereby causing the corners of the inner tube 302 to break contact with the internal sides of the outer tube 301. Some implementations of a straight composite 300*a* where an outer, square tube 301 and the inner square tube 302 are rigidly held during curing of previously deposited adhesive, brazing or welding may be a viable and a useful design due to strength to weight ratio improvement being produced, but the tendency of a thin walled, square tube to twist limits the length of the TCB that is practical for a given set of physical dimensions of the square tubes involved.

FIG. 4A, portrays a cross-sectional view 400*c*, of TCB 400. FIG. 4B and FIG. 4C portray, respectively, external and exploded views of TCB 400. FIG. 4C illustrates the components of TCB 400. FIGS. 4A-4C illustrate another methodology for producing the equivalent of TCB 300. In this technique, the square tube 403 is rotated 90 degrees, sandwiched between two u-channels 401 & 402 and then bonded together as shown in cross-section 400*c* by curing previously deposited adhesive, brazing or welding (Both continuous seam and plug welding may be employed). In some implementations grooves 404*a* and 404*b* may be formed in the middle of the interior backs of u-channels 401 and 402, respectively, to position the square tube 403 at a forty-five degree angle relative to the sides of u-channels 401 and 402. In some implementations, the square tube 403 dimensions are specified so that contact points, as shown by cross-section 400*c* in FIG. 4A, are in contact with the bonding agent being used which in turn is bonded at least at some points to the interior ends and bottom plates of u-channels 401 and 402. In some implementations, especially if seam welding is employed, the u-channel 401 to u-channel 402 contact jogs 402*a*1 and 402*c*1 are replaced by contact points equivalent to points 501*b*/502*a*/505*b*/505*a* and 503*b*/504*a*/505*d*/505*c* shown by cross-section 500*c* in FIG. 5A.

As illustrated in FIGS. 5A-5C, some TCB implementations, such as TCB 300 of FIG. 3B may be produced by bonding four right angles with legs of equal length to the four corners of a square rectangular tube by welding, brazing or curing adhesive. The dimensions of the square tube are specified so that the ends of the legs of the right angles may be positioned at the corners of the square tube for bonding as illustrated in FIG. 5A. Continuous, seam welding may produce a very strong TCB 500 with an increased strength to weight ratio compared to bonding by adhesive or brazing due to the bond area and to the increased strength of a welded bond.

TCB's, such as those illustrated by FIGS. 4A-14D, may be more producible and reliable than TCB's produced by insertion such as the TCB 200 illustrated in FIG. 2A. As to producibility, it is much easier to position a long component either underneath or on top of a second, tubular component than to insert a tube into another tube, especially if tight tolerances are required for bonding purposes or the tubes are long. (For insertion, the tubes need to be coaxial which becomes more difficult as the tubes become longer.) Positioning may require less factory floor space, especially long tubes up to 24 feet or more and may facilitate automation. For bonding by adhesive curing or brazing of TCB's produced by insertion, the bonding material must be applied prior to insertion. For the positioning technique, the bonding agent may be applied either before or after the components are positioned, in a jig, relative to one another. Both the positioning and application of bonding material or welding may be automated more readily with positioning than the insertion process. As to reliability, there is no assurance that previously deposited bonding material may not be disturbed or removed altogether in some places when one tube is inserted into another. Visual inspection of the bond is not feasible for TCB's produced by the insertion process. But, visual inspection of the deposited bonding material before and after completing the bonding process is practical for many designs assembled by the positioning technique, such as continuous seam welding of TCB 500 at contact points such as 501*a* to 505*a* in FIG. 5B. By permitting the production of a higher quality, automated bond, the positioning technique promises to produce a superior TCB, especially beams that are long (five feet or more) and have small cross-sectional areas. Positioning promises to provide, commercially, TCB's that may be cut to length for the application at hand. Patent reviews conducted so far have disclosed that the insertion process has only been used to produce relatively short sub-components from individual tubes (About 5 feet in length is the maximum as disclosed by Kosmowski, patent number U.S. Pat. No. 7,198,438 B2, issued Apr. 3, 2007). Positioning promises to provide the economic benefits of mass production and may accelerate the utilization of TCB's.

FIGS. 6A-8C and 9A-12C illustrate the application of positioning techniques to hexagon and octagon tubes, respectively, as was done for square tubes in FIGS. 3A-5C. The use of angles with legs of unequal lengths and welding techniques, illustrated in FIGS. 6A-8C, may be used with irregular (irregular in that at least two opposing sides' length is different in length than the length of the other sides, as is illustrated in FIG. 6A) hexagons or octagons to produce rectangular TCB's that have greater height to width ratios than the square TCB 500 of FIG. 5A. In addition, when curing deposited adhesive or brazing is the bonding technique employed, then TCB's 700 of FIG. 7B, 800 of FIG. 8B, 900 of 9B, 1000 of FIG. 10B, 1100 of FIG. 11B, 1200 of FIG. 12B, 1300 of FIG. 13B and 1400 of FIG. 14B may be superior in some implementations, as compared to adhesive or braze bonding angles with equal length legs to the face of applicable polygons, such as TCB 500 in FIG. 5A, due to the increased bonding area.

Figure 12A:
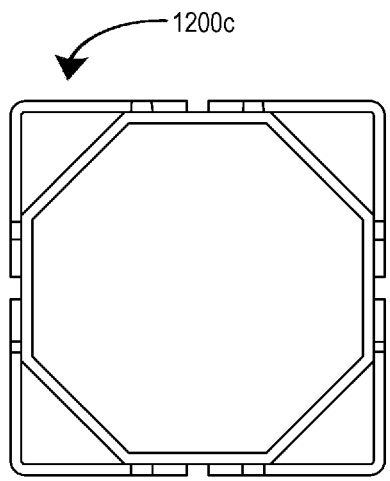
Figure 12B:
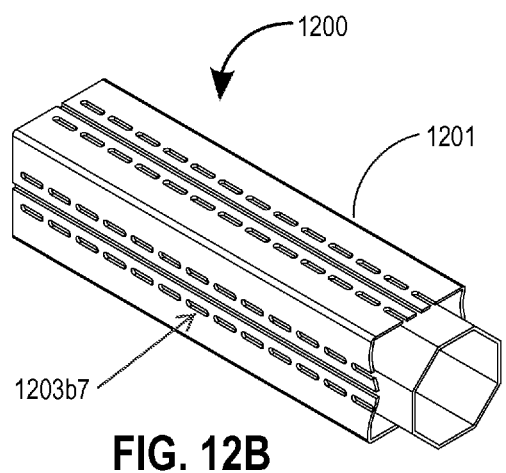
Figure 12C:
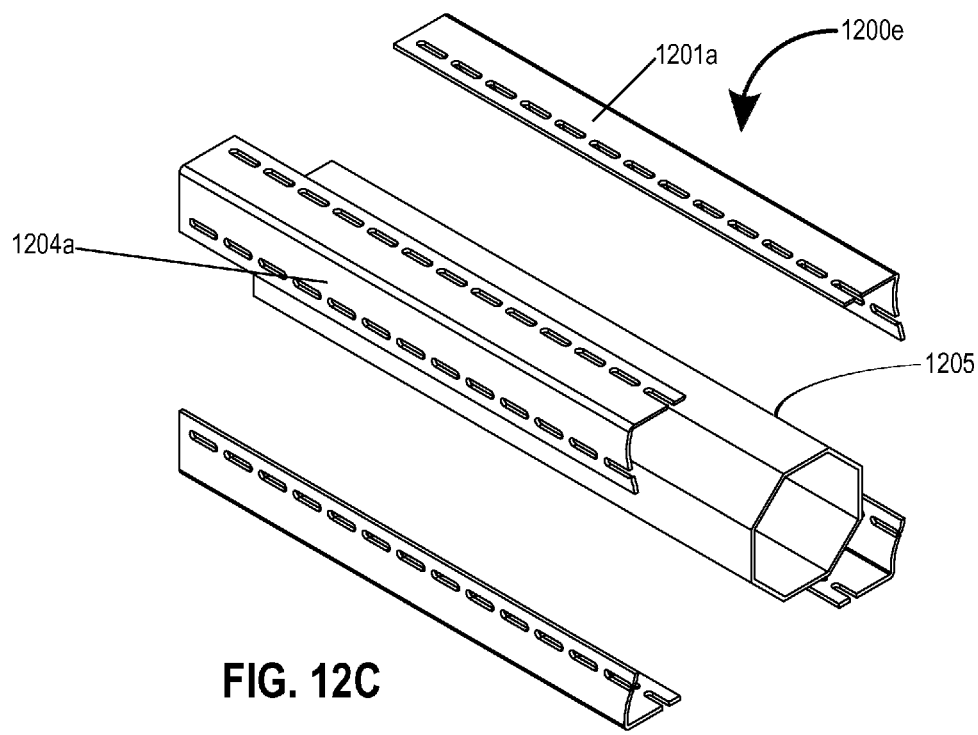

Some implementations of TCB's may use a third technique, as illustrated in FIGS. 12A-12C, to construct a TCB from four right angles with legs of equal or unequal length, such as angle 1201, and octagon 1205. As illustrated in FIGS. 12A-12C, each of the right angles have openings, such as slot 1203*b*7, near the edges of each side. The slots' shape and relative lengths of metal between slots compared to the length of the slots may depend upon the bonding technique. For example, the spacing shown in FIG. 12B may be used for arc welding. Changing the slots to round holes may permit plug welding as the bonding technique. Inverting the length of metal between slots as compared to the length of the slots may provide superior bonds when using adhesive or braze bonding due to increased surface area. The openings in the sides of the angles may also permit additional visual inspection of deposited material before bonding and bond's fillets after the bonding process is completed. The physical dimensions of octagon 1205 must be specified so that there is at least some contact area between the outer surface of octagon 1205 with the bonding material used which in turn contacts the interior surfaces and/or the ends of the legs of the four angles.

As shown in FIG. 13A, the cross-sectional view 1300c of TCB 1300, illustrated in FIG. 13B, contains four trapezoids, two large triangles and four smaller triangles. TCB 1300 may offer significant improvements in strength to weight ratios compared to a single, rectangular tube of equal weight. When welding is employed, the first step in the assembly of beam 1300 would be to sandwich the rectangular tube 1311 between channels 1307 and 1310 and weld at the intersection of channels 1307 and 1310 edges and the top 1311a and bottom 1311c exterior surfaces of tube 1311. The subassembly 1308/1309/1312 would be produced, similarly. The next step would be to weld the two 1307/1310/1311 and 1308/1309/1312 subassemblies together on each side with a seam or stitch weld at the two interfaces 1307e to 1308a and 1309e to 1310a. The following steps would be to weld four angles, such as angle 1301, and two side plates, such as side plate 1305, to the subassembly that resulted from the second step. Alternatively to welding, the bonding operation may be performed—either sequentially or simultaneously—with adhesive or by brazing. In some TCB implementations, two u-channels, one at the top and one at the bottom may replace the four angles, with the two side plates remaining. The dimensions of tubes 1311 & 1312 may be specified so that there is at least some connection between the exterior corners and/or ends of tubes 1311 and 1312 with the bonding material and the interior surfaces or edges of the ends of channels 1307, 1308, 1309 and 1310. The dimensions of channels 1307, 1308, 1309 and 1310 may be specified so that there is at least some contact between the exterior surfaces of channels 1307, 1308, 1309 and 1310, the bonding material and the interior surfaces or edges of the four right angles 1301, 1303, 1304 and 1306, as well as two side plates 1302 and 1305.

As illustrated in FIGS. 14A-C of the present disclosure, the two octagon high TCB 1300 of FIGS. 13A, B & C may be extended to three octagons high. The design of beam 1400 of FIG. 14B utilizes four exterior angles with legs of unequal lengths and slots in the longest side, six five-sided-four-angle channels and three rectangular tube components. As shown in the cross-sectional view 1400c of FIG. 14A, assembly of these components into beam 1400 of FIG. 14B produces six trapezoids and eight triangular figures (four of the larger size and four of the smaller) in the cross-sectional view 1400c. TCB 1400 may have significant resistance to axial loads, such as force 1414, applied normal to the top side of the beam. It also would have significant resistance to diagonally or torsional forces. As in the case of TCB 1300, the dimensions of rectangular tubes 1411, 1412 & 1413 and channels 1405, 1406, 1407, 1408, 11409 & 1410 may be specified so that there is at least some contact between the bonding materials and the mating surfaces of TCB 1400 as shown in cross-section 1400a in FIG. 14A. In addition the locations of slots in angles, such as 1403, may be specified so that they are positioned over and in contact with the bottom, exterior side of the respective channel's side, such as 1408c for slots 1403b1, 1403b2, 1403b3, etc.

In some implementations, TCB's similar to beam 1400 may consist of an array of 1400s subassemblies, the cross-section of which is shown in FIG. 14D, that consists of more than one assembly per row and more than one assembly per column. In addition, there are several other implementations of beam 1400 that have cross-sectional views similar to 1400c. Some examples are (1) to replace the four right angles with two u-channels that have slots in the legs and base, (2) to replace the four angles (1401, 1402, 1403 & 1404) with two u-channels that have legs of equal length and introduce four side plates, in an analogous fashion as illustrated in FIGS. 13A, B & C. Increased axial strength may be obtained by introducing to TCB 1400's cross-sectional view 1400c six rectangular tubes for which the width is the distance from the interior side of the bottom of channels 1405, 1406, 1407, 1408, 1409 & 1410 and the exterior, opposing sides of rectangles 1411, 1412 and 1413 and for which the height is equal to the width of the interior sides 1405c, 1406c, 1407c, 1408c, 1409c & 1410c of the bottom of channels 1405, 1406, 1407, 1408, 1409 & 1410. This addition would add twelve triangles to the cross-sectional view (The six trapezoids would still be present and contributing to the strength of the TCB.) and increase again the resistance of the resulting beam to axial loading as opposed to beam 1400. The increase in the strength to weight ratio would be dependent on the specifics of the design and may be rather limited for some implementations.

The complexity of TCB's such as 1400 makes the engineering trade-offs of strength, weight and costs goals verses the physical dimensions, density and material types or alloys of selected components, as well as the resulting manufacturing and material costs, quite difficult. Analytical software is required for practical analyses via computer of alternate designs. The use of geometries such as the triangle, rect-angles, trapezoids and other polynomials may simplify programming and increase the accuracy of the analytical software required for the engineering trade-offs of strength, weight and cost specifications for a specific TCBs' design.

In summary, detailed analyses of the failure modes of rectangular tubing has been disclosed that indicated that rectangular tubing is very susceptible to diagonally-applied axial loads. It has been disclosed that the diagonally force failure mode may be counteracted by a square-in-a-square design with one square rotated 45 degrees from the other to form a diamond. In this design, any diagonal force against one square would be a normal force against the other square. It has been disclosed that some rectangular TCB implementations may be built with rectangles, hexagons or octagons substituted for the internal square tube so that four reinforcing triangles are still present in the cross-sectional view. It has been disclosed that hexagon and octagon designs may be reinforced by using an internal rectangles between opposing sides of the hexagon or octagon; thus adding two more triangles to the hexagon design cross-section and two trapezoids to the octagon design cross-section. As TCB cross-sections become more complex and as the TCB becomes longer, the insertion method of manufacture may become more and more problematic. It was disclosed that this difficulty may be counteracted by positioning or stacking components of the TCB in a jig with the bonding material in place for adhesive curing or brazing in a belt furnace or oven. Alternatively, the jig may be used to hold the TCB components in place for welding. It has been disclosed that sub-TCB's may be stacked in arrays to produce TCB's that meet stringent requirements for withstanding axial and/or torsional loading. Finally, it has been disclosed that material alloy, material thickness, type of bond and material, and number of triangles and/or trapezoids may be adjusted to trade-off the weight ratio and costs goals of the application.

In conclusion, this disclosure transverses from the basic principle that if a TCB is manufactured by placing a rectangle-in-a-rectangle, then a diagonally applied force on the external rectangle is a normal force on the internal rectangle and vice versa to designing TCB's for which the cross-sectional view has multiple triangles and/or trapezoids to obtain an increase in the strength to weight ratio for the TCB as opposed to a single wall tube that has the same weight. The transition from simple, short TCB's to complex (multiple triangles and/or trapezoids—as illustrated by cross-section 1415c in FIG. 14D) and to longer TCB's required transversal from manufacture by insertion to manufacture by positioning. Many TCB design examples transverse from simple designs with only two to four triangles to very complex design implementations containing multiple triangles and trapezoids by incorporating tubes or channels of varied geometries into the TCB design. The designs presented only show examples of TCB implementations which may transverse to many additional implementations by the same type of components incorporated into the design. The complexity of TCBs' strength to weight ratio and cost fluctuations due to design, material and manufacturing procedures selected may require software programs that have been validated by physical tests. Implementing the designs and procedures of this disclosure promises to provide a new type of structural beams that are lighter, stronger and cheaper if supported by analytical software and mass manufacturing.

Reference throughout this specification to "an embodiment" or "implementation" or words of similar import means that a particular described feature, structure, or characteristic is included in at least one embodiment of the present invention. Thus, the phrase "in an embodiment" or a phrase of similar import in various places throughout this specification does not necessarily refer to the same embodiment.

Many modifications and other embodiments of the inventions set forth herein will come to mind to one skilled in the art to which these inventions pertain having the benefit of the teachings presented in the foregoing descriptions and the associated drawings.

The described features, structures, or characteristics may be combined in any suitable manner in one or more embodiments. In the above description, numerous specific details are provided for a thorough understanding of embodiments of the invention. One skilled in the relevant art will recognize, however, that embodiments of the invention can be practiced without one or more of the specific details, or with other methods, components, materials, etc. In other instances, well-known structures, materials, or operations may not be shown or described in detail.

What is claimed is:

1. A composite tubular beam comprising:
   an outer tube assembly;
   an inner tube assembly in a form of a polygon composed of only a plurality of straight line segments, each pair of straight line segments meeting at a vertex, and wherein the inner tube assembly is disposed within the outer tube assembly;
   a bonding material;
   wherein the inner tube is dimensioned such that a plurality of distal edges are joined with the bonding material to an interior surface of the outer tube assembly;
   wherein a physical contact exists between at least a portion of an outer surface of the inner tube assembly and at least a portion of the interior surface of the outer tube assembly; and
   wherein the resultant composite tubular beam cross-sectional view comprises a plurality of triangular and/or trapezoidal figures, thereby configured to provide the composite tubular beam with an increased resistance to failure under axial and torsional loads; and
   wherein the outer tube assembly comprises four right angles with legs of equal length joined to the inner tube assembly;
   wherein the inner tube assembly comprises a square and is disposed within the outer tube assembly at a plurality of contact points to the outer tube assembly; and
   wherein the inner tube assembly in the form of a square is placed within the outer tube assembly in a manner such that each square corner is placed at a midpoint of a side of the outer tube assembly and that a plurality of equal triangular shapes is internally formed.

2. The composite tubular beam of claim 1, wherein the inner triangular and/or trapezoidal figures are configured or arranged so that one set of triangular or trapezoidal figures counter act torsional loads and a second set counter act axial loads on the resulting tubular composite beam.

3. The composite tubular beam of claim 1, wherein the inner tube assembly is in a form of an equilateral, equiangular polygon.

4. The composite tubular beam of claim 1, wherein the outer tube assembly is integrally formed.

5. The composite tubular beam of claim 1, wherein the inner tube assembly is integrally formed.

6. The composite tubular beam of claim 1, wherein the outer tube assembly comprises two U-channels joined together and to the inner tube assembly, and wherein the inner tube assembly is disposed within the outer tube assembly at a plurality of contact points or grooves interior to the outer tube assembly.

* * * * *